(12) United States Patent
Deporter et al.

(10) Patent No.: US 11,718,065 B2
(45) Date of Patent: Aug. 8, 2023

(54) COMPOSITE STRUCTURES

(71) Applicant: ImerTech SAS, Paris (FR)

(72) Inventors: Craig Deporter, Lupsingen (CH); Larry H. McAmish, Flowery Branch, GA (US); David James Whiteman, Par Cornwall (GB); Octavius Othello Oju Davies, Winston Salem, NC (US)

(73) Assignee: Imertech SAS, Paris (FR)

( * ) Notice: Subject to any disclaimer, the term of this patent is extended or adjusted under 35 U.S.C. 154(b) by 336 days.

(21) Appl. No.: 14/774,947

(22) PCT Filed: Mar. 12, 2014

(86) PCT No.: PCT/GB2014/050727
§ 371 (c)(1),
(2) Date: Sep. 11, 2015

(87) PCT Pub. No.: WO2014/140563
PCT Pub. Date: Sep. 18, 2014

(65) Prior Publication Data
US 2016/0023432 A1    Jan. 28, 2016

Related U.S. Application Data

(60) Provisional application No. 61/784,836, filed on Mar. 14, 2013.

(51) Int. Cl.
*B32B 5/26* (2006.01)
*B32B 5/02* (2006.01)
(Continued)

(52) U.S. Cl.
CPC .......... *B32B 5/26* (2013.01); *B32B 5/022* (2013.01); *B32B 5/08* (2013.01); *D04H 1/413* (2013.01);
(Continued)

(58) Field of Classification Search
CPC ..... B32B 27/12; B32B 5/022; B32B 2555/02; B32B 2307/51; B32B 27/20;
(Continued)

(56) References Cited

U.S. PATENT DOCUMENTS 3,692,618 A    9/1972 Dorschner et al.
3,802,817 A    4/1974 Matsuki et al.
(Continued)

FOREIGN PATENT DOCUMENTS

CN    1201846 A    12/1998
CN    1334133 A    2/2002
(Continued)

OTHER PUBLICATIONS

"Paper Coating Pigments", Tappi Monograph Series No. 30, 1966, pp. 34-35.
(Continued)

*Primary Examiner* — Humera N. Sheikh
*Assistant Examiner* — Elizabeth D Ivey
(74) *Attorney, Agent, or Firm* — Finnegan, Henderson, Farabow, Garrett & Dunner, LLP

(57) ABSTRACT

A composite structure may include at least two nonwoven, polymeric layers bonded to each other. At least one nonwoven, polymeric layer may include inorganic particulate filler in an amount up to about 40% by weight of the nonwoven layer.

20 Claims, 7 Drawing Sheets

(51) Int. Cl.
*D04H 1/413* (2012.01)
*D04H 3/16* (2006.01)
*D04H 3/14* (2012.01)
*B32B 5/08* (2006.01)
*D01D 5/098* (2006.01)
*D01F 6/06* (2006.01)
*D01F 1/10* (2006.01)

(52) U.S. Cl.
CPC ............... *D04H 3/14* (2013.01); *D04H 3/16* (2013.01); *B32B 2250/03* (2013.01); *B32B 2250/05* (2013.01); *B32B 2250/20* (2013.01); *B32B 2250/24* (2013.01); *B32B 2250/40* (2013.01); *B32B 2262/0253* (2013.01); *B32B 2262/0261* (2013.01); *B32B 2262/0276* (2013.01); *B32B 2264/10* (2013.01); *B32B 2264/102* (2013.01); *B32B 2264/104* (2013.01); *B32B 2264/12* (2013.01); *B32B 2305/20* (2013.01); *B32B 2307/54* (2013.01); *B32B 2307/718* (2013.01); *B32B 2307/724* (2013.01); *B32B 2307/7265* (2013.01); *B32B 2307/73* (2013.01); *B32B 2437/02* (2013.01); *B32B 2535/00* (2013.01); *B32B 2555/02* (2013.01); *D01D 5/0985* (2013.01); *D01F 1/10* (2013.01); *D01F 6/06* (2013.01)

(58) Field of Classification Search
CPC ............... B32B 2307/54; B32B 5/26; B32B 2038/0028; B32B 25/10; B32B 2305/30; B32B 2250/20; B32B 2250/24; B32B 2255/02; B32B 2264/10
See application file for complete search history.

(56) References Cited

U.S. PATENT DOCUMENTS

| | | | |
|---|---|---|---|
| 3,849,241 | A | 11/1974 | Butin et al. |
| 4,340,563 | A | 7/1982 | Appel et al. |
| 9,194,065 | B2 | 11/2015 | Moore et al. |
| 2010/0184348 | A1* | 7/2010 | McAmish ............ D04H 1/728 442/417 |
| 2011/0151737 | A1* | 6/2011 | Moore ............... D04H 1/4291 442/334 |
| 2011/0151738 | A1* | 6/2011 | Moore ............... D04H 1/4291 442/334 |

FOREIGN PATENT DOCUMENTS

| | | |
|---|---|---|
| CN | 101358410 A | 2/2009 |
| CN | 101432478 A | 5/2009 |
| CN | 101517140 A | 8/2009 |
| CN | 101652231 A | 2/2010 |
| EP | 0 614 948 A1 | 9/1994 |
| EP | 2 749 679 A1 | 7/2014 |
| JP | 2001-040564 A | 2/2001 |
| JP | 2001-288371 A | 10/2001 |
| JP | 2004-003096 A | 1/2004 |
| JP | 3157310 U | 1/2010 |
| JP | 2010-529309 A | 8/2010 |
| JP | 2010-234285 A | 10/2010 |
| JP | 2011-052332 A | 3/2011 |
| JP | 2013-515175 A | 5/2013 |
| WO | WO 00/38914 | 7/2000 |
| WO | 2008077156 A2 | 6/2008 |
| WO | WO 2010/117612 A2 | 10/2010 |
| WO | WO 2011/106205 A2 | 9/2011 |
| WO | WO 2012/054636 A1 | 4/2012 |
| WO | WO 2014/011839 A1 | 1/2014 |

OTHER PUBLICATIONS

"The Nonwovens Handbook", Association of Nonwoven Fabrics Industry, 1968.
Encyclopedia of Polymer Sciene and Engineering, John Wiley and Sons, vol. 10, 1987.
Spunbond Technology Today 2—Onstream in the 90's, Miller Freeman, Inc., 1992, pp. 11-16.
International Search Report and Written Opinion dated Nov. 4, 2014, in International Application No. PCT/GB2014/050727.
Search Report issued by the State Intellectual Property Office of China in Chinese application No. 201480028077.8, dated 2016.

* cited by examiner

COMPOSITE STRUCTURES

CLAIM FOR PRIORITY

This application is a U.S. national phase entry under 35 U.S.C. § 371 from PCT International Application No. PCT/GB2014/050727, filed Mar. 12, 2014, which claims the benefit of priority of U.S. Provisional Application No. 61/784,836, filed Mar. 14, 2013, the subject matter of both of which is incorporated herein by reference.

TECHNICAL FIELD

The present invention is directed to a composite structure comprising at least two nonwoven, polymeric layers bonded to each other, to articles and products comprising or formed from said composite structure, and to a process for making said composite structure.

BACKGROUND OF THE INVENTION

Polymeric nonwovens, for example, polypropylene (PP) nonwovens are used in many applications. In hygiene and medical markets, there are a large percentage of spunmelt nonwovens used, where spunbond and meltblown nonwovens are made into a composite nonwoven structure. Normally, the meltblown (M) is an internal layer with the outer layers being the spunbonded (S) nonwoven. The M layer provides a barrier layer, but the same fine fibers (ca. 2 microns or less in diameter) that provide a good barrier also give very weak fibers and fabrics. The spunbond layers (ca. 15 micron fiber diameter) are included to give the composite fabric sufficient strength to be processed in converting lines as well as function in the intended application.

Functionally, where SMS (or any variant thereof, like the common SSMMS, SMMMS, SSMMMS, etc. products) is used it is because it provides a certain barrier performance. Common examples are medical drapes and gowns (where the medical personnel and patient need a barrier to pathogens), diaper leg cuffs (for sealing in urine), feminine care "wings", and diaper core wrap (to seal in superabsorbent powder). As such, the M layer may be regarded as the primary functional layer.

Spunbond PP nonwovens are often thermally bonded with heated calender rolls containing thousands of raised shapes, whereas the PP is partially melted/deformed through a combination of heat and pressure to give bond points. These bond points anchor multiple fibers to a single location and give the fabric strength. There is an optimum bonding point, which is a combination of temperature, pressure, speed, and embossing shape. When a nonwoven is underbonded, when a fabric is stressed to breaking (a tensile test) the individual fibers will pull out of a bond point or the bond point will disintegrate and the elongation at break will be relatively high. When a nonwoven is overbonded, the fibers will break at the bonding point since the excessive melting at that point creates a fiber weak point and the elongation at break will be very low. When the optimum bonding conditions are met, the majority of the fiber breakage will occur between bond points. This affords a fabric with the highest tensile strength and the elongation is between the two extremes.

Meltblown fibers are much more sensitive to temperature than spunbond fibers due to the fact that they are attenuated at higher temperatures and do not have the same strength and crystallinity of spunbond fibers. Practically, this means that the meltblown fibers melt or deform at lower temperatures than spunbond. Melting and deformation of the fibers in the meltblown layer also destroys a certain amount of the barrier performance of the layer. Therefore, the bonding conditions used to bond SMS fabrics tend towards underbonding of the S layer so that the barrier performance is maintained.

There is an ongoing need for new and improved polymeric nonwoven materials. More particularly, it would be desirable to increase the strength of nonwoven materials without adversely affecting barrier performance.

SUMMARY OF THE INVENTION

In accordance with a first aspect, there is provided a composite structure comprising at least two nonwoven, polymeric layers bonded to each other, wherein at least one nonwoven, polymeric layer comprises inorganic particulate filler in an amount up to about 40% by weight of the nonwoven layer. In certain embodiments, the composite structure according to first aspect has one or more of the following physical and mechanical properties: (i) a hydrostatic head ranging from about 400 mm to about 1000 mm; (ii) an air permeability ranging from about 400 l/m$^2$s to about 900 l/m$^2$s; (iii) a MD tensile strength ranging from about 95.0 N/5 cm to about 120.0 N/5 cm; (iv) a CD tensile strength ranging from about 40.0 N/5 cm to about 60.0 N/5 cm; (v) a MD elongation ranging from about 60% to about 120%; and (vi) a CD elongation ranging from about 60% to about 120%.

In accordance with a second aspect, there is provided an article or product formed from or comprising a composite structure according to first aspect of the present invention, for example, a health care, personal care or hygiene article or product.

In accordance with a third aspect, there is provided a process for preparing a composite structure according to the first aspect of the present invention, said process comprising bonding together at least two nonwoven, polymeric layers, wherein at least one nonwoven, polymeric layer comprises inorganic particulate filler in an amount up to about 40% by weight of the nonwoven layer.

DETAILED DESCRIPTION OF THE FIGURES

Figure 1:
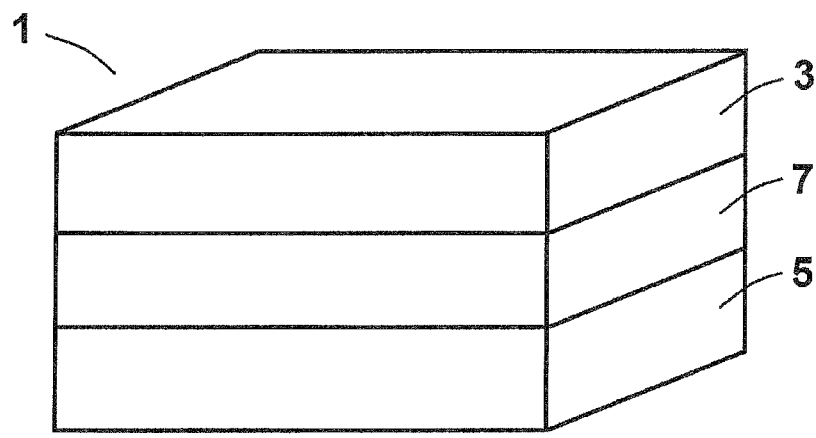
FIG. 1 is a schematic depiction of a S-M-S type layer structure.

FIGS. 3-8 summarize various experimental information and results.

DETAILED DESCRIPTION

As used herein, the term "composite" means a structure which is made from two or more constituent materials with different physical and/or chemical properties. The individual components remain distinct with the finished structure. In accordance with certain embodiments of the present invention, the composite structure comprises at least two nonwoven, polymeric layers bonded to each other. Thus, the at least two nonwoven, polymeric layers will have different physical and/or chemical properties. In certain embodiments in which the composite comprises more than two nonwoven, polymeric layers, e.g., three nonwoven, polymeric layers, at least two of the nonwoven, polymeric layers will have different physical and/or chemical properties. In such embodiments, two of the nonwoven, polymeric layers may have the same physical and/or chemical properties, or more than two of the nonwoven, polymeric layers may have the same physical and/or chemical properties if the composite comprises at least four nonwoven, polymeric layers.

As used herein, the term "nonwoven" means a manufactured sheet, web or bat of directionally or randomly oriented fibers, bonded by friction, and/or cohesion and/or adhesion, or by any other suitable means, excluding paper or products which are woven, knitted, tufted stitch bonded incorporating binding yarns or filaments, or felted by wet milling, whether or not additionally needled. The fibers may be of natural or man-made origin. They may be staple or continuous or be formed in situ. In certain embodiments, the term "nonwoven" used herein means a nonwoven as defined in ISO 9092:2011.

Inorganic Particulate Filler

At least one of the nonwoven, polymeric layers of the composite structure comprises inorganic particulate filler in an amount up to about 40% by weight, based on the total weight of the nonwoven layer comprising said inorganic particulate filler.

In certain embodiments, the inorganic particulate filler is selected from an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, wollastonite, bauxite, talc, mica, perlite or diatomaceous earth, or magnesium hydroxide, or aluminium trihydrate, or combinations thereof. Any of the aforementioned materials may be coated (or uncoated) or treated (or untreated). The filler may be a single filler or may be a blend of fillers. For example, the filler may be a blend of two or more of the fillers listed herein. Hereafter, certain embodiments of the invention may tend to be discussed in terms of calcium carbonate, and in relation to aspects where the calcium carbonate is processed and/or treated. The invention should not be construed as being limited to such embodiments.

In certain embodiments, the inorganic particulate comprises, consists of or consists essentially of coated calcium carbonate, for example, coated or treated calcium carbonate.

The inorganic particulate filler may have a mean particle size ($d_{50}$) from about 0.1 μm to about 10 μm, for example from about 0.1 μm to about 8 μm, or from about 0.1 μm to about 6 μm, or from about 0.1 μm to about 4 μm, or from about 0.1 μm to about 3 μm, or from about 0.5 μm to about 3 μm, or from about 0.5 μm to about 2.5 μm, or from about 0.5 μm to about 2 μm. The inorganic particulate filler may have a $d_{98}$ of about 15 μm or less, for example, a $d_{98}$ of about 10 μm or less, or less than about 8 μm, for example about 4 μm to about 8 μm, or about 4 μm to about 5 μm, or about 5 μm to about 6 μm or about 6 μm to about 8 μm. The inorganic particulate filler may have a $d_{90}$ of about 12 μm or less, for example, a $d_{90}$ of about 10 μm or less, or 8 μm or less, or about 5 μm or less, or about 4 μm or less. For example, the inorganic particulate filler may have a $d_{90}$ of about 3 μm to about 5 μm, or about 3 μm to about 4 μm. Particular examples of particle size distributions are: $d_{90}$ equal to about 4 μm and $d_{98}$ equal to about 8 μm; $d_{90}$ equal to about 3 μm to about 4 μm and $d_{98}$ equal to about 6 μm to about 8 μm; $d_{90}$ equal to about 3 μm to about 4 μm and $d_{98}$ equal to about 4 μm to about 5 μm; $d_{90}$ equal to about 3 μm to about 5 μm and $d_{98}$ equal to about 5 μm to about 8 μm or about 5 μm to about 6 μm. In the particular examples of particle size distributions described immediately above, the inorganic particulate filler may have a $d_{90}$ of from about 0.1 μm to about 4 μm, or from about 0.1 μm to about 3 μm, or from about 0.5 μm to about 3 μm, or from about 0.5 μm to about 2.5 μm, or from about 0.5 μm to about 2 μm.

In addition, the inorganic particulate filler may be characterized by a "top cut" value. As used herein, the term "top cut" refers to the particle diameter at which 98% of the particles in the sample of filler have a smaller diameter. In one embodiment, the inorganic particulate filler has a top cut of about 15 μm or less. In another embodiment, the top cut is about 10 μm or less. In a further embodiment, the top cut is about 8 μm or less. In yet another embodiment, the top cut is about 6 μm or less. In yet a further embodiment, the top cut is about 4 μm or less. In still another embodiment, the top cut ranges from about 4 μm to about 15 μm. In still a further embodiment, the top cut ranges from about 4 μm to about 12 μm. In another embodiment, the top cut ranges from about 4 μm to about 10 μm. In a further embodiment, the top cut ranges from about 4 μm to about 8 μm. In yet another embodiment, the top cut ranges from about 4 μm to about 6 μm.

In certain embodiments, very low levels of particles above a particular size, which may be referred to herein as "coarse material", (or as "hard material"), which are present in fillers, e.g. processed minerals, may be detrimental for a range of applications in which the filler may be used; in particular those where fillers are incorporated into polymer compositions. For example, the present inventors have discovered that only a few ppm of coarse particles present in a material intended for use in a polymer fibre based application resulted in an undesirable rise in pressure when the polymer fibre was being extruded.

Thus, with respect to the various aspects and embodiments of the present invention, the filler may comprise less than about 3 ppm of particles having a particle size greater than about 38 μm, or greater than about 30 μm, or greater than about 25 μm or greater than about 20 μm. These particles and those particles having a particle size greater than or equal to about 40 μm may be described herein as "coarse particles" or "coarse material" or as "hard particles" or "hard material".

Also, with respect to the various aspects and embodiments of the present invention, the coarse particle content may range from: less than or equal to about 2 ppm; less than or equal to about 1 ppm; less than or equal to about 0.5 ppm; less than or equal to about 0.2 ppm. The coarse particle content may range from 0 ppm or about 0 ppm to about 2 ppm, or may range from 0 ppm or about 0 ppm to about 1 ppm, or may range from 0 ppm or about 0 ppm to about 0.5 ppm, or may range from 0 ppm or about 0 ppm to about 0.2 ppm. In all of the preceding ranges the lower limit of coarse particle content may be about 0.1 ppm.

In order to determine the amount of coarse particles present, the inorganic particulate filler may be suspended in a liquid in which the filler does not aggregate. A suitable liquid is isopropyl alcohol, also known as propan-2-ol or simply IPA. The suspension is then fed through a suitably sized meshed screen, for example, a meshed screen possessing square holes, or alternatively, fed to a sifter, such as a centrifugal sifter which may be referred to as a rotary sifter. The mesh screen may be a fine woven screen or a laser ablated screen. The screen residue is left to dry at room temperature and the retained residue removed and weighed. The amount of residue compared to the initial sample weight allows for the characterisation of the amount of coarse particles in ppm. The sieved (or sifted) material and the screen residue may be analysed using optical microscopy.

Unless otherwise stated, particle size properties referred to herein for the particulate fillers or materials are as measured in a well known manner by sedimentation of the particulate filler or material in a fully dispersed condition in an aqueous medium using a Sedigraph 5100 machine as supplied by Micromeritics Instruments Corporation, Norcross, Ga., USA (web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{98}$ and the $d_{90}$ are the values determined in this way of the particle e.s.d. at which there are 98% and 90% respectively by weight of the particles which have an equivalent spherical diameter less than that $d_{98}$ or $d_{90}$ value.

The particulate calcium carbonate used in the present invention may be obtained from a natural source by grinding or may be prepared synthetically by precipitation (PCC), or may be a combination of the two, i.e. a mixture of the naturally derived ground material and the synthetic precipitated material. The PCC may also be ground.

Ground calcium carbonate (GCC), i.e. ground natural calcium carbonate is typically obtained by grinding a mineral source such as chalk, marble or limestone, which may be followed by a particle size classification step, in order to obtain a product having the desired degree of fineness. The particulate solid material may be ground autogenously, i.e. by attrition between the particles of the solid material themselves, or alternatively, in the presence of a particulate grinding medium comprising particles of a different material from the calcium carbonate to be ground.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

When the filler is obtained from naturally occurring sources, it may be that some mineral impurities will inevitably contaminate the ground material. For example, naturally occurring calcium carbonate occurs in association with other minerals. Also, in some circumstances, minor additions of other minerals may be included, for example, one or more of kaolin, calcined kaolin, wollastonite, bauxite, talc or mica, could also be present. In general, however, the filler used in the invention will contain less than 5% by weight, preferably less than 1% by weight of other mineral impurities.

PCC may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, limestone is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process, the milk of lime is contacted with soda ash to produce, by double decomposition, a precipitate of calcium carbonate and a solution of sodium hydroxide. The sodium hydroxide must be substantially completely separated from the calcium carbonate if this process is to be commercially attractive. In the third main commercial process, the milk of lime is first contacted with ammonium chloride to give a calcium chloride solution and ammonia gas. The calcium chloride solution is then contacted with soda ash to produce, by double decomposition, precipitated calcium carbonate and a solution of sodium chloride.

The process for making PCC results in very pure calcium carbonate crystals and water. The crystals can be produced in a variety of different shapes and sizes, depending on the specific reaction process that is used. The three main forms of PCC crystals are aragonite, rhombohedral and scalenohedral, all of which are suitable for use in the present invention, including mixtures thereof.

When used in a nonwoven, polymeric layer described herein, the maximum size of the particles is typically less than the thickness of the layer.

Optionally, the inorganic particulate filler may be coated. For example, the calcium carbonate (GCC or PCC) may be coated with a hydrophobising surface treatment agent. For example, the calcium carbonate may be coated with one or more aliphatic carboxylic acids having at least 10 chain carbon atoms. For example, the calcium carbonate may be coated with one or more fatty acids or salts or esters thereof. The fatty acids may be selected from stearic acid, palmitic acid, behenic acid, montanic acid, capric acid, lauric acid, myristic acid, isostearic acid and cerotic acid. The coated calcium carbonate may be a stearate coated calcium carbonate. The level of coating may be about 0.5 wt % to about 1.5 wt %, for example about 0.8 wt % to about 1.3 wt % based on the dry weight of the inorganic particulate filler.

The inorganic particulate filler is present in at least one nonwoven, polymeric layer in an amount up to about 40% by weight, based on the total weight of the nonwoven polymeric layer. In certain embodiments, the inorganic particular filler is present in an amount of from about 0.1 to about 35% by weight, for example, from about 0.1 to about 30% by weight, or from about 0.1 to about 25% by weight, or from about 0.1 to about 20% by weight, or from about 1 to about 30% by weight, or from about 2 to about 25% by weight, or from about 3 to about 20% by weight, or from about 4 to about 18% by weight, or from about 4 to about 16% by weight, or from about 5 to about 15% by weight, or from about 5 to about 12% by weight, or from about 5 to about 10% by weight, or from about 10 to about 30% by weight, or from about 10 to about 25% by weight, or from about 10 to about 20% by weight, or from about 10 to about 18% by weight, or from about 12 to about 16% by weight, based on the total weight of the nonwoven, polymeric layer. In embodiments, in which the inorganic particulate filler is coated, the amounts of filler described herein include the weight of the coating.

In certain embodiments in which more than one nonwoven, polymeric layer comprises inorganic particulate filler, the amount of inorganic particulate in each layer may be the same or different.

In certain embodiments, at least one of the nonwoven, polymeric layers is substantially free of inorganic particulate filler. For example, in embodiments in which the composite structure comprises at least one nonwoven, polymeric layer which is spunbonded (as described herein), and at least one nonwoven, polymeric layer which is meltblown, the at least one nonwoven, polymeric layer which is meltblown may be substantially free of inorganic particulate filler Nonwoven, Polymeric Layers The nonwoven, polymeric layers of the composite structure may comprise at least one polymeric resin selected from conventional polymeric resins that provide the desired properties for any particular composite structure or application thereof. In certain embodiments, the at least one polymer resin is selected from thermoplastic polymers, including but not limited to, polyolefins, such as polypropylene and polyethylene homopolymers and copolymers, including copolymers with 1-butene, 4-methyl-1-pentene, and 1-hexene; polyamides, such as nylon; polyesters; copolymers of any of the above-mentioned polymers; and blends thereof. In certain embodiments, each nonwoven, polymeric layer comprises the same polymer resin, or the same polymer resin blend.

In certain embodiments, the polymeric resin comprises, consists essentially of, or consists of polypropylene.

In addition to the polymeric resin and, when present, the inorganic particulate filler, at least one of the nonwoven, polymer layers may further comprise at least one additive (i.e., an additive other than the inorganic particulate filler). The at least one additive may be chosen from additional mineral fillers, for example talc, gypsum, diatomaceous earth, kaolin, attapulgite, bentonite, montmorillonite, and other natural or synthetic clays. The at least one additive may be chosen from inorganic compounds, for example silica, alumina, magnesium oxide, zinc oxide, calcium oxide, and barium sulfate. In certain embodiments, the at least one further additive is selected from one or more of the group consisting of: optical brighteners, heat stabilizers, antioxidants, antistatic agents, anti-blocking agents, dyestuffs, pigments, including but not limited to titanium dioxide, luster improving agents, surfactants, natural oils and synthetic oils.

In certain embodiments, each of the nonwoven, polymeric layers present in the composite comprises spunlaid fibres, that is, fibres of the polymeric resins described herein which are made by a continuous process in which the fibres are spun and dispersed in a nonwoven web. Two examples of spunlaid processes are spunbonding, producing a spon-bonded web of polymeric fibres, or meltblowing, producing a meltblown web of polymeric fibres.

Spunbonded fibers may be produced by spinning the polymeric resin into the shape of a fibre, for example, by heating the resin at least to its softening temperature, extruding the resin through a spineret to form fibers, and transferring the fibres to a fiber draw unit to be collected in the form of spunlaid webs. In certain embodiments, the polymeric resin is heated to a temperature ranging from about 180° C. to about 240° C., for example, from about 200° C. to about 220° C. Spunbonded fibers may be produced by any of the known techniques including but not limited to general spun-bonding, flash-spinning, needle-punching, and water-punching processes. Exemplary spun-bonding processes are described in *Spunbond Technology Today 2—Onstream in the 90's* (Miller Freeman (1992)), U.S. Pat. No. 3,692,618 to Dorschner et al., U.S. Pat. No. 3,802,817 to Matuski et al., and U.S. Pat. No. 4,340,563 to Appel et al., each of which is incorporated herein by reference in its entirety.

Meltblown fibers may be produced by any of the known techniques. For example, meltblown fibers may be produced by extruding the at least one polymer resin and attenuating the streams of resin by hot air to form fibers with a fine diameter and collecting the fibers to form spunlaid webs. One example of a meltblown process is generally described in U.S. Pat. No. 3,849,241 to Buntin, which is incorporated by reference herein in its entirety.

The filler may be incorporated into the polymer resin using conventional methods. For example, the filler may be added to the polymer resin during any step prior to extrusion, for example, during or prior to the heating step. In another embodiment, a "masterbatch" of at least one polymer resin and filler may be premixed, optionally formed into granulates or pellets, and mixed with at least one additional virgin polymer resin before extrusion of the fibers. The additional virgin polymer resin may be the same or different from the polymer resin used to make the masterbatch. In certain embodiments, the masterbatch comprises a higher concentration of the particulate filler, for instance, a concentration ranging from about 20 to about 75 wt %, than is desired in the final product, and may be mixed with the polymer resin in an amount suitable to obtain the desired concentration of filler in the final spunlaid fiber product. For example, a masterbatch comprising about 50 wt % coated calcium carbonate may be mixed with an equal amount of the virgin polymer resin to produce a final product comprising about 25 wt % coated calcium carbonate. The masterbatch may be mixed and pelletized using suitable apparatus. For example, a ZSK 30 Twin Extruder may be used to mix and extrude the coated calcium carbonate and polymer resin masterbatch, and a Cumberland pelletizer may be used to optionally form the masterbatch into pellets.

In certain embodiments, the filler is coated or treated before incorporation into the polymer resin. In other embodiments, the filler is coated or treated in situ within the polymer resin.

Once the particulate filler or masterbatch is mixed with the polymer resin, the mixture may be extruded continuously through at least one spinneret to produce long filaments. The extrusion rate may vary according to the desired application. In one embodiment, the extrusion rate ranges from about 0.3 grams per hole per minute (GHM) to about 2.5 GHM. In another embodiment, the extrusion rate ranges from about 0.3 GHM to about 2.0 GHM, for example, from about 0.3 GHM to about 1.5 GHM, or from about 0.3 GHM to about 1.2 GHM, or from about 0.4 GHM to about 0.8 GHM, or from about 0.4 to about 0.6 GHM.

The extrusion temperature may also vary depending on the desired application. For example, the extrusion temperature may range from about 180 to about 260° C. The extrusion temperature may range from about 220 to about 250° C. The extrusion apparatus may be chosen from those conventionally used in the art, for example, the Reicofil 4 apparatus produced by Reifenhauser. The spinneret of the Reicofil 4, for example, contains 6800 holes per metre length approximately 0.6 mm in diameter.

After extrusion, the filaments may be attenuated. Spunbonded fibers, for example, may be attenuated by high-speed drafting, in which the filament is drawn out and cooled using a high velocity gas stream, such as air. The gas stream may create a draw force on the fibers that draws them down into a vertical fall zone to the desired level. Meltblown fibers may, for example, be attenuated by convergent streams of hot air to form fibers of fine diameter.

After attenuation, the fibers may be directed onto a foraminous surface, such as a moving screen or wire. The fibers may then be randomly deposited on the surface with some fibers laying in a cross direction, so as to form a loosely bonded web or sheet. In certain embodiments, the web is held onto the foraminous surface by means of a vacuum force. At this point, the web may be characterized by its basis weight, which is the weight of a particular area of the web, expressed in grams per square meter (gsm). The basis weight of the web may range from about 1 to about 70 gsm, for example, from about 2 to about 55 gsm, or from about 5 to about 40 gsm, or from about 12 to about 35 gsm, or from about 12 to about 30 gsm, or from about 12 to about 25 gsm, or from about 12 to about 20 gsm. Hence, the basis weight of any particular nonwoven, polymer layer of the composite structure may range from about 1 to about 70 gsm, for example, from about 5 to about 55 gsm, or from about 10 to about 40 gsm, or from about 12 to about 35 gsm, or from about 12 to about 30 gsm, or from about 12 to about 25 gsm, or from about 12 to about 20 gsm.

Once a web is formed, it may be bonded according to conventional methods, for example, melting and/or entanglement methods, such as thermal point bonding, ultrasonic bonding, hydroentanglement, and through-air bonding. Thermal point bonding is a commonly used method and generally involves passing the web of fibers through at least one heated calender roll to form a sheet. In certain embodiments, thermal point bonding may involve two calendar rolls where one roll is embossed and the other smooth. The resulting web may have thermally embossed points corresponding to the embossed points on the roll.

After bonding, the resulting sheet may optionally undergo various post-treatment processes, such as direction orientation, creping, hydroentanglement, and/or embossing processes. The optionally post-treated sheet may then be used to manufacture various nonwoven products, as described herein. Methods for manufacturing nonwoven products are generally described in the art, for example, in *The Nonwovens Handbook*, The Association of the Nonwoven Industry (1988) and the *Encyclopedia of Polymer Science and Engineering*, vol 10, John Wiley and Sons (1987).

Spunlaid fibers may have an average diameter ranging from about 0.5 µm to about 35 µm or more. The spunbonded fibers may have a diameter ranging from about 5 µm microns to about 35 µm. The spunbonded fibers may have a diameter of about 15 µm.

The spunbonded fibers may have a diameter of about 16 µm. The meltblown fibers may have a diameter ranging from about 0.5 µm to about 30 µm. The meltblown fibers may have a diameter of about 2 µm to about 7 µm. The meltblown fibers may have a smaller diameter than spunbonded fibers of the same or a similar composition. The spunbonded or meltblown fibers may range in size from about 0.1 denier to about 25 denier. The fibers may range in size from about 0.1 denier to about 20 denier. The fibers may range in size from about 1 to about 15 denier. The fibers may range in size from about 1 to about 10 denier. The fibers may range in size from about 1 to about 5 denier. The fibers may be about 0.1, or about 0.5, or about 1, or about 2, or about 3, or about 4, or about 5, or about 6, or about 7, or about 8 or about 9, or about 10 denier in size.

Composite Structure and Method of Manufacture

The composite structure comprises at least to at least two nonwoven, polymeric layers bonded to each other. At least one nonwoven, polymeric layer comprises inorganic particulate filler in an amount up to about 40% by weight of the nonwoven layer.

In certain embodiments, the composite structure comprises at least three nonwoven, polymeric layers bonded to each other, for example, at least four nonwoven, polymeric layers bonded to each other, or at least five nonwoven, polymeric layers bonded to each other, or at least six nonwoven, polymeric layers bonded to each other, or at least seven nonwoven, polymeric layers bonded to each other, or at least eight nonwoven, polymeric layers bonded to each other, or at least nine nonwoven, polymeric layers bonded to each other, or at least ten nonwoven, polymeric layers bonded to each other, or at least twelve nonwoven, polymeric layers bonded to each other. In certain embodiments, the composite structure comprises other materials, for example, further layers of material, other than the nonwoven, polymeric layers described herein.

In certain embodiments, the composite structure comprises at least two, for example, at least three, nonwoven, polymeric layers bonded to each other and at least one of the nonwoven, polymeric layers is spunbonded (hereinafter referred to as an "S" layer), and at least one of the nonwoven, polymeric layers is meltblown (hereinafter referred to as an "M" layer). In certain embodiments, the S layer or each of the S layers comprise inorganic particulate filler in an amount up to about 40% by weight of the S layer, for example, in an amount of from about 0.1 to about 30% by weight, or from about 1 to about 20% by weight, or from about 2 to about 18% by weight, or from about 3 to about 16% by weight, or from about 4 to about 15% by weight. Optionally, the M layer or each of the M layers are substantially free of inorganic particulate filler. Alternatively, the M layer or each of the M layers may comprise less inorganic particulate filler than the S layers. Alternatively, the M layer or each of the M layers comprise less than about 15% by weight inorganic particulate material, based on the total weight of each M layer, for example, less than about 10% by weight inorganic particulate material, or less than about 5% by weight inorganic particulate filler.

In certain embodiments, an outermost layer of the structure is an S layer. A schematic depiction of a three layered composite is depicted in FIG. 1. In this illustrative embodiment, the outermost layers (3, 5) of the composite (1) are S layers and the central layer, or sandwiched layer is an M layer (7). For illustrative purposes only, the thickness of each layer is greatly exaggerated. This can be described as a S-M-S layered structure.

In practice, the thickness (i.e., the dimension perpendicular to the plane of the layers) of the composite structure is typically between about 100 µm and 2 mm, for example, less than about 1.5 mm, or less than about 1.0 mm, or less than about 800 µm, or less than about 600 µm, or less than about 500 µm, or less than about 400 µm, or less than about 300 µm, or less than about 200 µm.

In certain embodiments, the composite structure has a S-M-S layered structure, or an S-M-M-S layered structure, or a S-M-M-M-S layered structure, or a S-M-M-M-M-S layered structure, wherein at least one or both of the S layers comprise inorganic particulate filler in an amount up to about 40% by weight of the layer. The S layer or each of the S layers may comprise inorganic particulate filler in an amount of from about 0.1 to about 30% by weight, or from about 1 to about 20% by weight, or from about 2 to about 18% by weight, or from about 3 to about 16% by weight, or from about 4 to about 15% by weight. Each S layer may comprise the same or different amount of inorganic particulate filler. Optionally, one, or two, or three, or all, of the M layers are substantially free of inorganic particulate filler. Alternatively, the M layer or each of the M layers may comprise less inorganic particulate filler than the S layers. Alternatively, the M layer or each of the M layers comprise less than about 15% by weight inorganic particulate material, based on the total weight of each M layer, for example, less than about 10% by weight inorganic particulate material, or less than about 5% by weight inorganic particulate filler.

Figure 2:
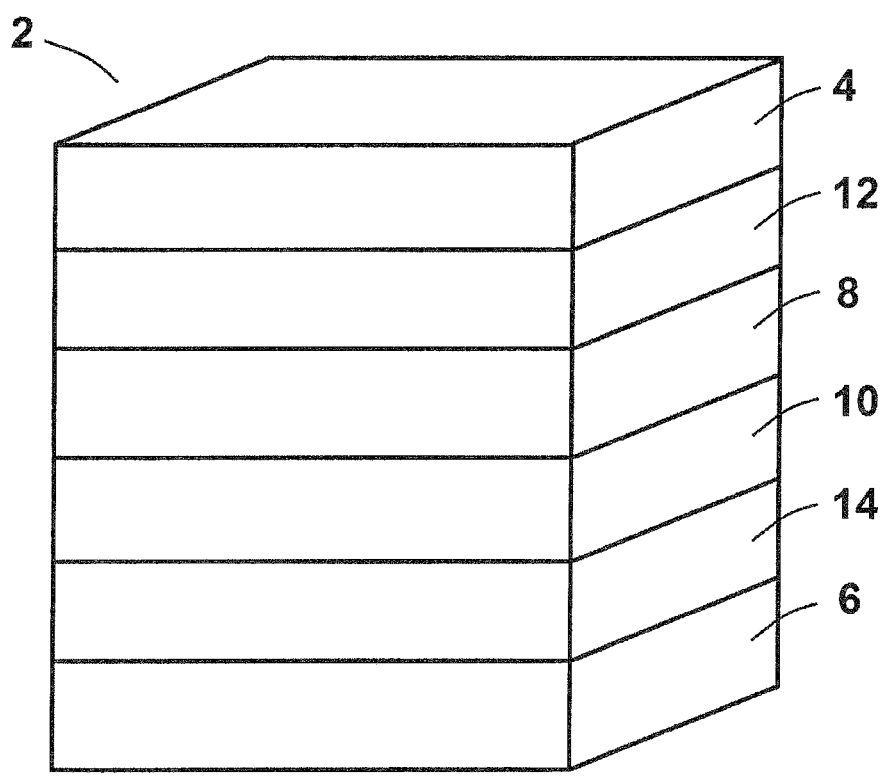
FIG. 2 is a schematic depiction of a S-S-M-M-S-S type layer structure.
Figure 3A:
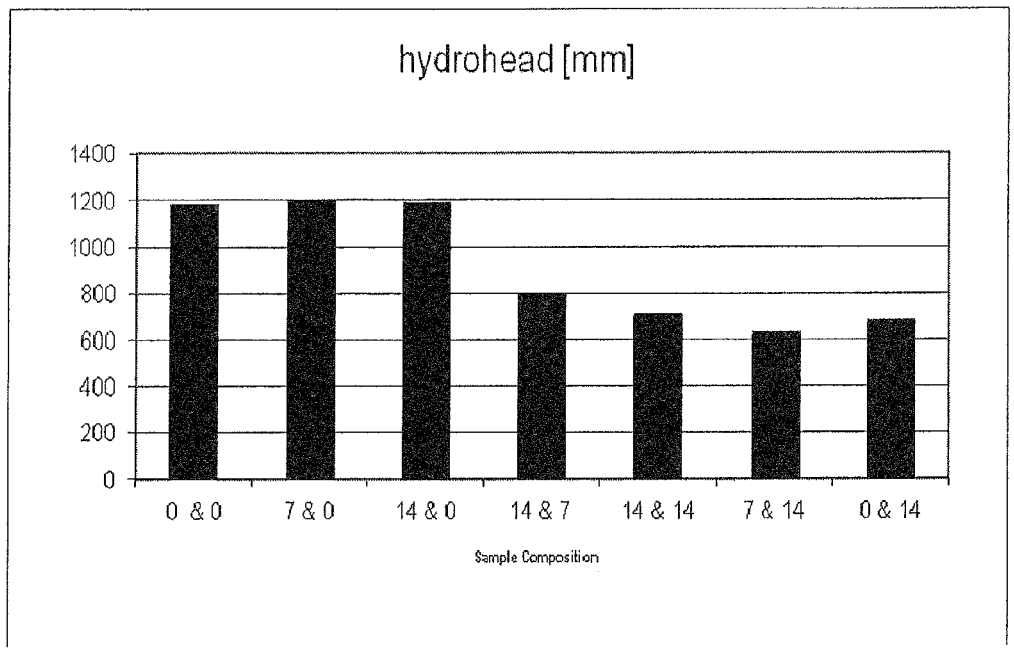
Figure 3B:
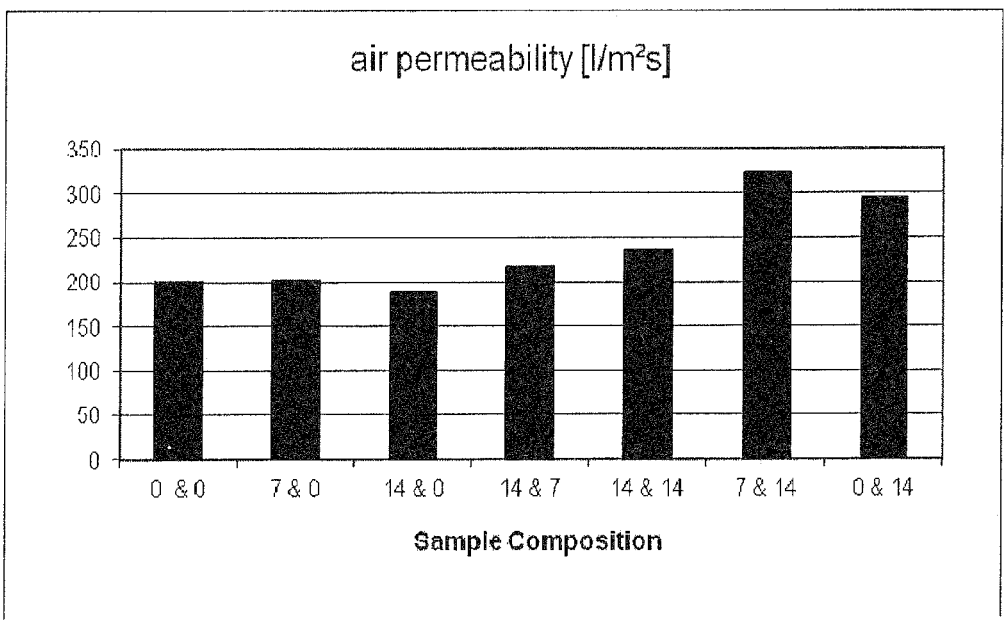
Figure 4A:
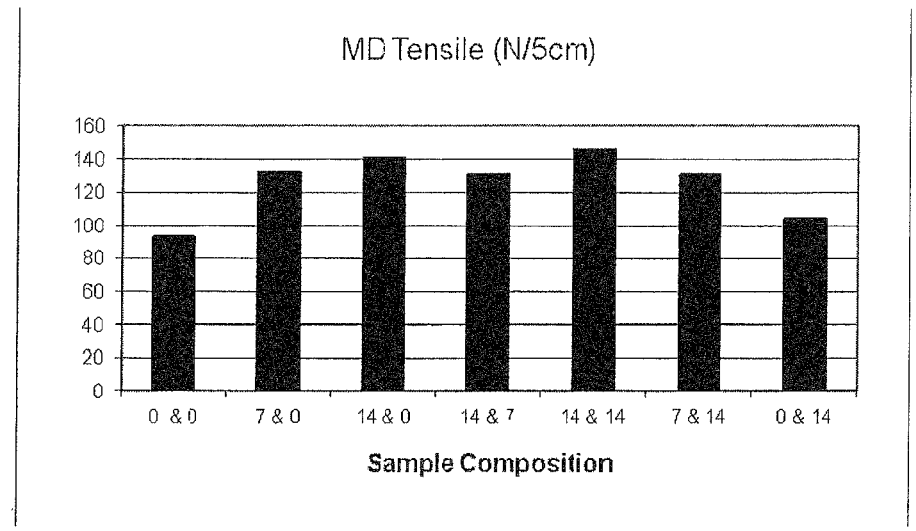
Figure 4B:
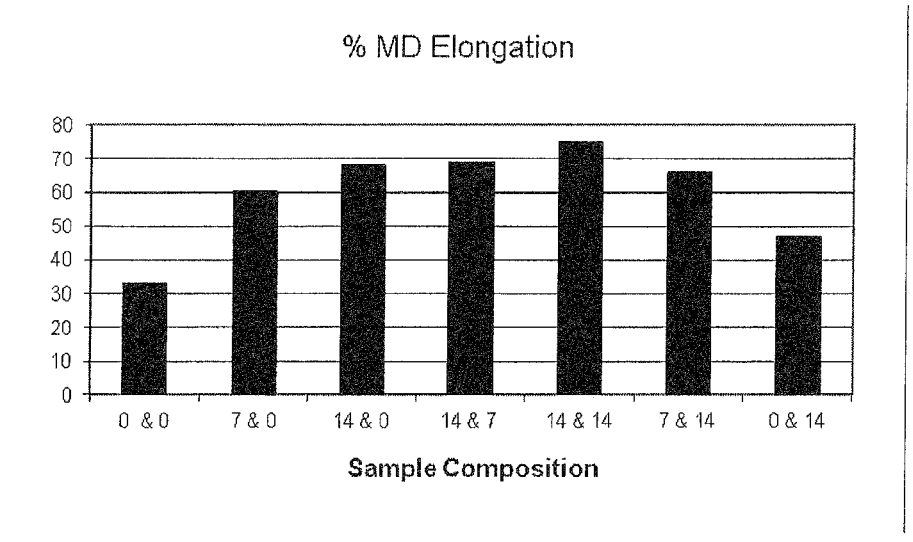
Figure 5A:
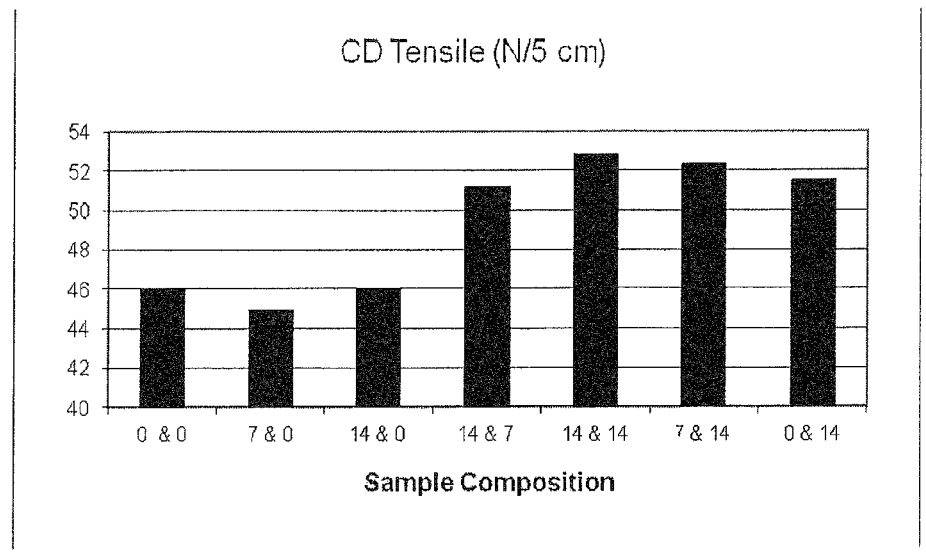
Figure 5B:
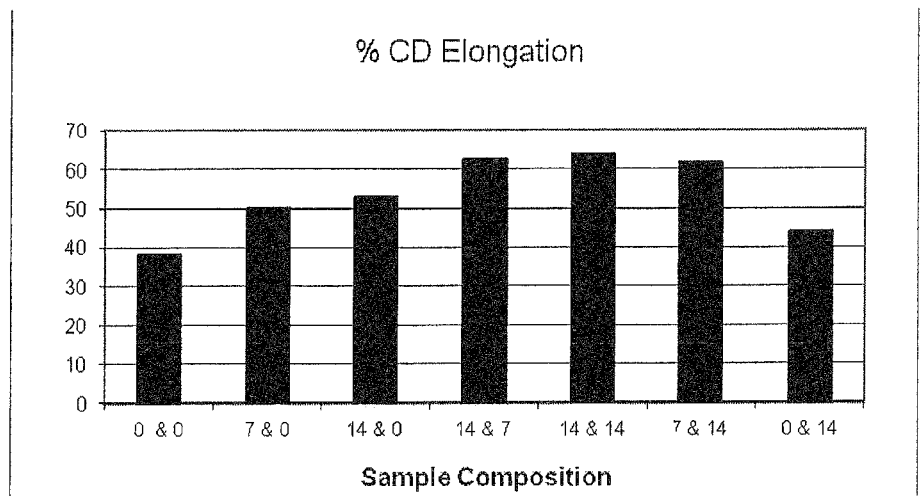
Figure 6A:
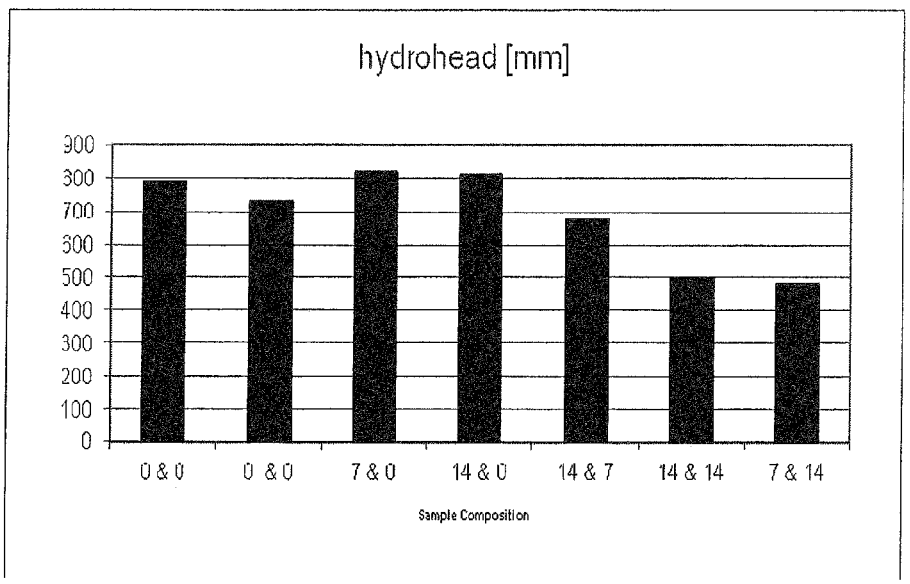
Figure 6B:
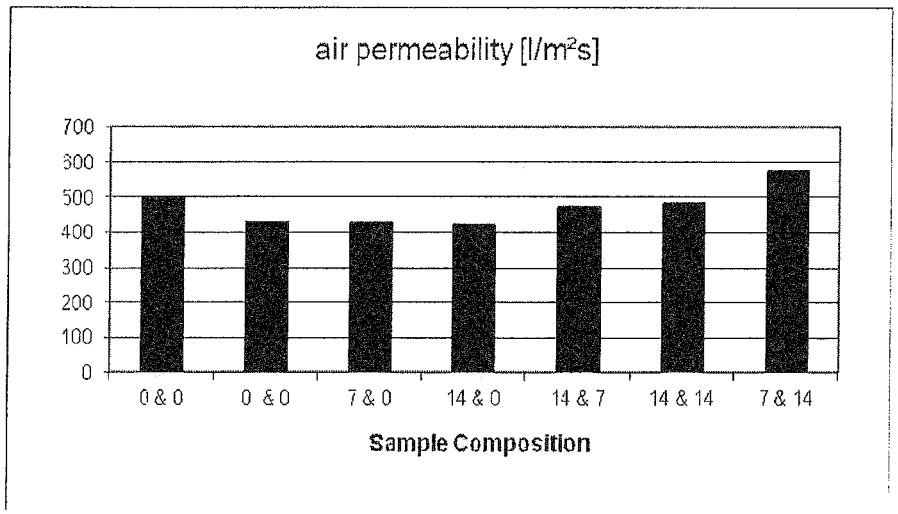
Figure 7A:
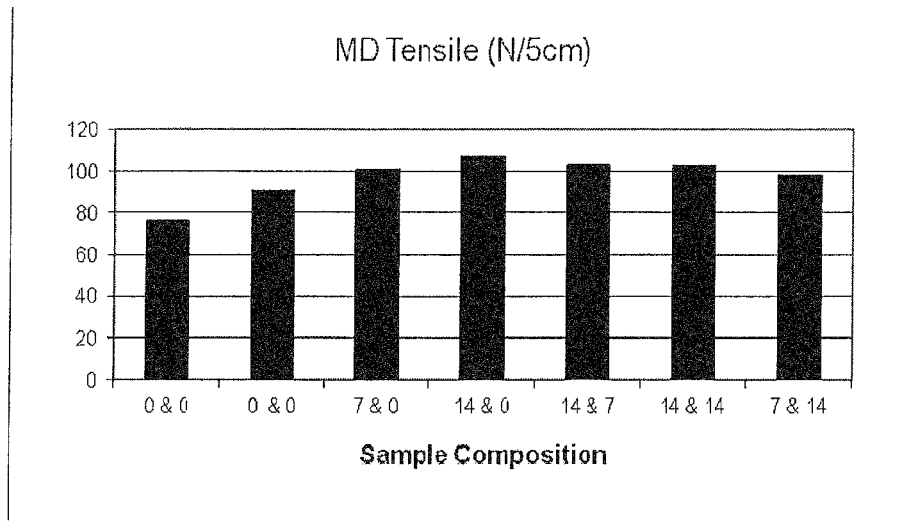
Figure 7B:
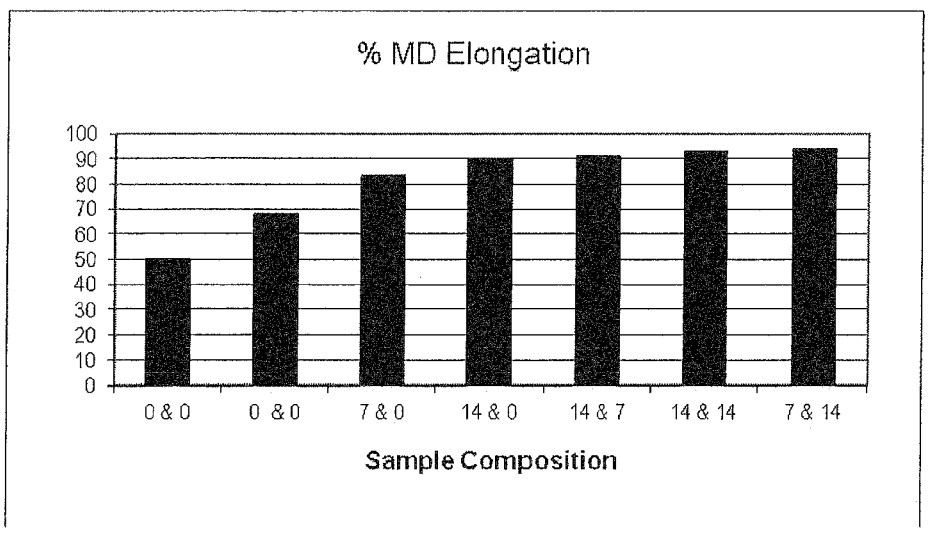
Figure 8A:
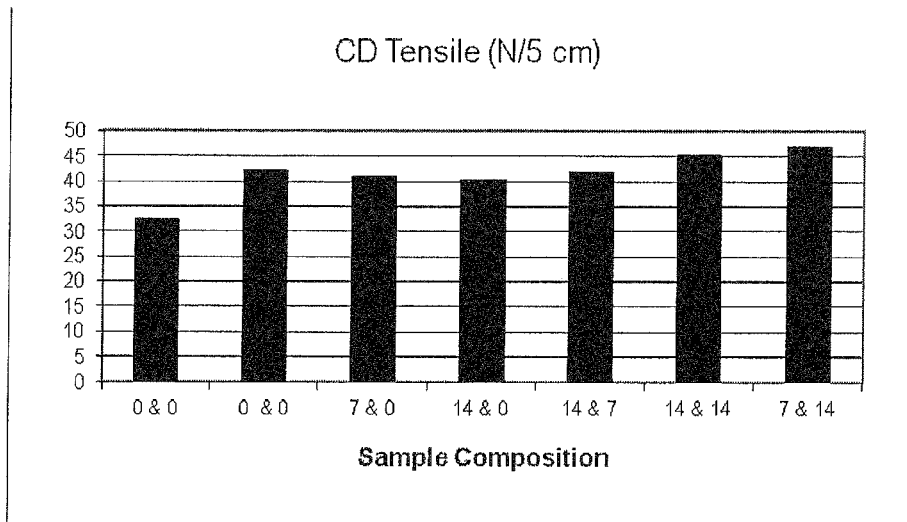
Figure 8B:
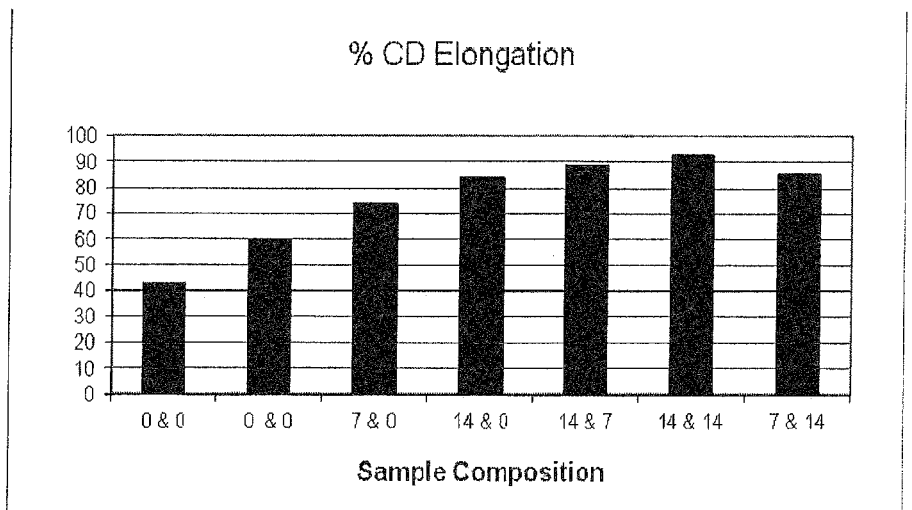

In certain embodiments, the composite structure has a S-S-M-S layered structure, or a S-S-M-S-S layered structure, or a S-S-M-M-S layered structure, or a S-S-M-M-S-S layered structure, or a S-S-M-M-M-S layered structure, or a S-S-M-M-M-S-S layered structure, or a S-S-M-M-M-M-S layered structure, or a S-S-M-M-M-M-S-S layered structure, wherein (i) at least one or both of the outermost S layers comprises inorganic particulate filler in an amount up to about 40% by weight of the layer, or (ii) all of the S layers comprise inorganic particulate filler in an amount up to about 40% by weight of the layer. The S layer or each of the S layers may comprise inorganic particulate filler in an amount of from about 0.1 to about 30% by weight, or from about 1 to about 20% by weight, or from about 2 to about 18% by weight, or from about 3 to about 16% by weight, or from about 4 to about 15% by weight. Each S layer may comprise the same or different amount of inorganic particulate filler. Optionally, one, or two, or three, or four, or all, of the M layers are substantially free of inorganic particulate filler. Alternatively, the M layer or each of the M layers may comprise less inorganic particulate filler than the S layers. Alternatively, the M layer or each of the M layers comprise less than about 15% by weight inorganic particulate material, based on the total weight of each M layer, for example, less than about 10% by weight inorganic particulate material, or less than about 5% by weight inorganic particulate filler. A schematic depiction of a six layered, S-S-M-M-S-S, composite is depicted in FIG. 2. In this illustrative embodiment, the outermost layers (4, 6) of the composite (2) are S layers and the central layers, or sandwiched layers, are both M layers (8,10). There is a further S layers (12, 14) between each central M layer (8, 10) and outermost S layer (4,6). For illustrative purposes only, the thickness of each layer is greatly exaggerated.

In certain embodiments of the S-M-S (or S-S-M-S, S-S-M-M-S, etc) structures described above, at least one of the S layers comprises, or two of the S layers, or three of the S layers, or all of the S layers, each comprise, from about 0.1 to about 20% by weight inorganic particulate filler, based on the total weight of each layer.

In certain embodiments of the S-M-S (or S-S-M-S, S-S-M-M-S, etc) structures described above, at least one of the M layers comprises, or two of the M layers, or three of the M layers, or four of the M layers, or all of the M layers, each comprise from about 0.1 to about 20% by weight inorganic particulate filler, for example, from about 5 to about 20% by weight inorganic particulate filler.

In certain embodiments, the composite structure has a basis weight of from about 10 to about 200 gsm, for example, from about 10 to about 150 gsm, or from about 10 to about 100 gsm, or from about 10 to about 80 gsm, or from about 10 to about 70 gsm, or from about 10 to about 60 gsm, or from about 15 to about 60 gsm, or from about 20 to about 60 gsm, or from about 25 to about 60 gsm, or from about 30 to about 60 gsm, or from about 30 to about 40 gsm, or from about 40 to about 50 gsm, or from about 50 to about 60 gsm.

As discussed above, in S-M-S type structures, the primary function of the M layer is to provide a barrier, for example, to the passage of liquids, such as water and urine, or to the passage of pathogens, or to seal in superabsorbent powders. The primary function of the S layer(s) is to give the composite enough strength to be processed in converting lines and to function in the intended application.

The present inventor has surprisingly found that the incorporation of inorganic particulate filler in the composite structure, for example, in the S layer, enables the strength of the composite to be increased, but without adversely effecting M layer barrier performance. This is especially important in the medical/health care applications in which the strength of the medical product, for example, drape or gown, is directly correlated to the safety of the medical staff or patient. Whilst not wishing to be bound by theory, it is seems that the higher thermal conductivity of the inorganic particulate filler relative to the virgin polymeric resin, e.g., polypropylene, enables a lower optimum bonding temperature which, in turn, allows bonding to occur at temperatures below the normal M degradation temperatures.

Thus, in certain embodiments, the composite structure may be characterised by having one or more of the physical or mechanical properties, determined at a basis weight of 34 gsm, and in accordance with the following test methods:

Hydrostatic head (HSH), according to AATCC 127, is the height of a column of water (in mm) needed to cause the composite to leak.

Air permeability ($l/m^2s$) is determined in accordance with ASTM D-737.

Cross machine direction (CD), machine direction (MD) tensile strength (both in Newtons per 5 cm strip (N/5 cm)), CD elongation (%) and MD elongation (%) are determined in accordance with ISO 9073-3:1989.

Thus, in certain embodiments, the composite structure has:
(i) a HSH of at least about 400 mm, for example, from about 400 mm to about 1000 mm, or from about 450 mm to about 1000 mm, or from about 500 mm to about 1000 mm, or from about 600 mm to about 950 mm, or from about 650 mm to about 900 mm, or from about 700 mm to about 900 mm, or from about 700 mm to about 850 mm, or from about 750 mm to about 850 mm, or from about 800 to about 900 mm, or from about 850 to about 900 mm, or from about 800 to about 850 mm; and/or
(ii) an air permeability of at least about 400 $l/m^2s$, for example, from about 400 to about 900 $l/m^2s$, for example, from about 400 to about 800 $l/m^2s$, or from about 400 to about 700 $l/m^2s$, or from about 400 to about 600 $l/m^2s$, or from about 400 to about 500 $l/m^2s$, or from about 500 to about 600 $l/m^2s$, or from about 450 to 500 $l/m^2s$; and/or
(iii) a MD tensile strength of at least 95.0 N/5 cm, or at least about 100.0 N/5 cm, for example, from about 95.0 to about 120.0 N/5 cm, of from about 97.0 to about 115.0 N/5 cm, or from about 100.0 to about 110.0 N/5 cm, or from about 101.0 to about 108.0 N/5 cm; and/or
(iv) a CD tensile strength at least 35.0 N/5 cm, or at least about 40.0 N/5 cm, for example, from about 40.0 to about 60.0 N/5 cm, of from about 41.0 to about 50.0 N/5 cm, or from about 45.0 to about 50.0 N/5 cm; and/or
(v) a MD elongation of at least about 55%, for example, at least about 60%, for example, from about 60 to about 120%, or from about 65 to about 110%, or from about 70 to about 110%, or from about 80 to about 110%, or from about 85 to about 100%, or from about 90 to about 100%, or from about 10 to about 95%; and/or
(vi) a CD elongation of at least about 55%, for example, at least about 60%, for example, from about 60 to about 120%, or from about 65 to about 110%, or from about 70 to about 110%, or from about 80 to about 110%, or from about 80 to about 100%, or from about 85 to about 100%, or from about 85 to about 95%.

In certain embodiments the composite structure may be characterised as having a combination of HSH and one or more of air permeability, MD tensile strength, CD tensile strength, MD elongation and CD elongation. For example, in certain embodiments, the composite structure has a HSH of at least about 400 mm, for example, from about 400 mm to about 1000 mm, and an air permeability of at least about 400 l/m²s, for example, from about 400 to about 900 l/m²s. Additionally or alternatively, the composite structure may have a HSH of at least about 400 mm, for example, from about 400 mm to about 1000 mm, and a MD tensile strength of at least 95.0 N/5 cm, or at least about 100.0 N/5 cm. Additionally or alternatively, the composite structure may have a HSH of at least about 400 mm, for example, from about 400 mm to about 1000 mm, and a CD tensile strength at least 35.0 N/5 cm, or at least about 40.0 N/5 cm. Additionally or alternatively, the composite structure may have a HSH of at least about 400 mm, for example, from about 400 mm to about 1000 mm, and a MD elongation of at least about 55%, for example, at least about 60%. Additionally or alternatively, the composite structure may have a HSH of at least about 400 mm, for example, from about 400 mm to about 1000 mm, and a CD elongation of at least about 55%, for example, at least about 60%.

In certain embodiments, the composite structure may be characterised in terms of the ratio of HSH to one of air permeability, MD tensile strength, CD tensile strength, MD elongation and CD elongation, determined at a basis weight of 34 gsm and in accordance with the test methods described above.

For example, in certain embodiments, the composite structure has a ratio of HSH (in mm)/MD tensile strength (in N/5 cm) which is less than a ratio of HSH (in mm)/MD tensile strength (in N/5 cm) of a comparable composite structure in which none of the S and M layers comprise inorganic particulate filler. In certain embodiments, the composite structure has a ratio of HSH/MD tensile strength of less than about 10.0, for example, less than about 9.0, or less than about 8.0, or less than about 7.0, or less than about 6.5. or less than about 6.0, or less than about 5.5, or less than about 5.0.

In certain embodiments, the composite structure has a ratio of HSH (in mm)/CD tensile strength (in N/5 cm) which is less than a ratio of HSH (in mm)/CD tensile strength (in N/5 cm) of a comparable composite structure in which none of the S and M layers comprise inorganic particulate filler. In certain embodiments, the composite structure has a ratio of HSH/MD tensile strength of less than about 20.0, for example, less than about 18.0, or less than about 17.0, or less than about 16.0, or less than about 15.0 or less than about 14.0, or less than about 13.0, or less than about 12.0. or less than about 11.0, or less than about 10.5.

In certain embodiments, the composite structure has a ratio of HSH (in mm)/MD elongation (in %) which is less than a ratio of HSH (in mm)/MD elongation (in %) of a comparable composite structure in which none of the S and M layers comprise inorganic particulate filler. In certain embodiments, the composite structure has a ratio of HSH/MD elongation of less than about 12.0, for example, less than about 10.0, or less than about 8.0, or less than about 6.0, or less than about 5.5.

In certain embodiments, the composite structure has a ratio of HSH (in mm)/CD elongation (in %) which is less than a ratio of HSH (in mm)/CD elongation (in %) of a comparable composite structure in which none of the S and M layers comprise inorganic particulate filler. In certain embodiments, the composite structure has a ratio of HSH/CD elongation of less than about 12.0, for example, less than about 11.5, or less than about 11.0, or less than about 10.0, or less than about 8.0, or less than about 6.0, or less than about 5.5.

The composite structures of the present invention may be prepared by a process comprising bonding together at least two nonwoven, polymeric layers, wherein at least one nonwoven, polymeric layer comprises inorganic particulate filler in an amount up to about 40% by weight of the nonwoven layer. In certain embodiments, at least one nonwoven, polymeric layer is spunbonded and comprises inorganic particulate filler in an amount up to about 40% by weight of the nonwoven layer, and at least one nonwoven, polymeric layer is meltblown.

The process may further comprise preparing or obtaining the at least one nonwoven, polymer layer which is spunbonded, and preparing or obtaining the at least one nonwoven, polymeric layer which is meltblown, and bonding together the at least one spunbonded layer and the at least one meltblown layer to form the composite structure. The spunbonded and meltblown polymeric layers may be prepared in accordance with the methods described herein. The relative amounts of polymeric resin and inorganic additive will be selected in suitable amounts to obtain the desired composite structure. As discussed above, a masterbatch comprising polymer resin and inorganic particulate filler may be prepared first, which is combined with further virgin polymer resin and any other optional additives, and then spunlaid according to the methods described herein.

The at least two nonwoven, polymeric layers are bonded together using any suitable means. Typically, bonding is effected by stacking and pressing the nonwoven layers together under the application of heat. As discussed above, the presence of inorganic particulate filler in at least one of the nonwoven polymeric layers enables the bonding process to be conducted at a temperature which is lower compared to that required to bond conventional nonwoven composites, i.e., composite in which none of the layers comprise inorganic particulate filler as described herein. Thus, in certain embodiments, the bonding process comprises bonding at a first maximum bonding temperature which is lower than a second maximum bonding temperature for a bonding process suitable for bonding together a comparable composite structure in which none of the nonwoven, polymeric layers comprise inorganic particulate filler as described herein. The second maximum bonding temperature (i.e., convention bonding temperature) may be between 150.0° C. and 155° C. Thus, in certain embodiments, the bonding process comprises bonding at a maximum temperature of less than 150.0° C., for example, equal to or less than about 149.5° C., or equal or less than about 149.0° C. or equal or less than about 148.5° C., or equal to or less than about 148.0° C., or equal to or less than about 147.5° C., or equal to or less than about 147.0° C., or equal to or less than about 146.5° C., or equal to or less than about 146.0° C., or equal to or less than about 145.5° C., or equal to or less than about 145.0° C. In certain embodiments, the bonding process is conducted at a maximum temperature of from about 145.0° C. to less than 150.0° C., for example, from about 145.0° C. to about 149.5° C., or from about 145.0° C. to about 149.0° C., or from about 145.0° C. to about 148.5° C., or from about 145.0° C. to about 148.0° C. Whilst a reduction in maximum bonding temperature of 2-5° C. may seem trivial, in practice this is a significant advantage, not only for the strength properties of the composite, as described above, but also in reducing cost because less energy is required to bond the composite.

In other embodiments, the bonding process comprises bonding at a maximum temperature of from about 135° C. to about 165° C., for example, from about 135° C. to about 160° C., or from about 135° C. to about 155° C., or from about 135° C. to about 150° C., or from about 140° C. to about 155° C., or from about 140° C. to about 150° C., or from about 145° C. to about 155° C., or from about 135° C. to about 145° C.

Pressing may be carried out between rollers. The temperature is applied by having the rollers in an oven, or the rollers may be heated. The rollers may be calendaring rollers and/or embossing rollers. In certain embodiments, bonding may involve two calendar rolls where one roll is embossed and the other smooth. The resulting composite may have thermally embossed points corresponding to the embossed points on the roll.

In certain embodiments, the process further comprises (i) incorporating the composite structure in an article or product, as described below or (ii) forming an article or product from the composite structure. In certain embodiments, the article or product is a health care, personal care or hygiene article or product.

Applications and Articles/Products

The composite structure may find utility in many fields of endeavour, including, for example, agriculture and landscaping, household and home furnishings, industrial/military, automotive, leisure travel, health care, personal care and hygiene, clothing, construction/civil engineering, geotextiles and office.

The composite structure may be comprised in products and articles of manufacture, including:

Health care products and articles: surgical caps and masks; shoe covers; sponges; dressings; wipes; orthopaedic padding; bandages; tapes; cuffs; dental bibs; medical drapes; wraps; packs; sterile packaging; medical gowns, including patient gowns, examination gowns, surgical gowns and contamination control gowns; bed linen; and underpads.

Personal care and hygiene products and articles: diapers; feminine hygiene products, including sanitary napkins, towels and tampons; training pants; adult incontinence products; dry and wet wipes; cosmetic applicators/removers; lens tissue; and hand warmers.

Household and home furnishings products and articles: vacuum cleaner bags; tea/coffee bags; buff pads; aprons; souring pads; fabric softener sheets; dust cloths; mop heads; trash or rubbish bags; placemats; napkins; ironing board covers/pads; washcloths; table cloths; furniture construction sheeting; cushion ticking; dust covers; decking; skirt linings; pull strips; quilt backing; blankets; pillows and pillow cases; flanging; spring wrap; wallcovering backings; acoustical wallcoverings; upholstery backings; window treatment; drapery components; carpet backings and carpets; and mattress pad components.

Agriculture and landscaping products and articles: crop covers; turf protection products; nursery overwintering; weed control fabrics; root bags; containers; and capillary matting.

Industrial/military products and articles: coated fabrics; filters; semiconductor polishing pads; wipers; clean room apparel; air-conditioning filters; military clothing; abrasives; cable insulation; reinforced plastics; tapes; protective clothing, including lab coats; sorbents; lubricating pads; flame barriers; packaging; conveyor belts; display felts, papermaker felts, and noise absorbent felt.

Automotive products and articles: trunk applications; floor covers; side, front and back liner; wheelhouse covers; rear shelf trim panel covers; seat applications; listings; cover slip sheets; foam reinforcements; transmission oil filters; door trim panel carpets; door trim panel padding; vinyl; landau cover backings; molded headliner substrates; hood silence pads; and dash insulators.

Clothing products and articles: interlinings; clothing and glove insulation; bra and shoulder padding; handbag components; and shoe components.

Geotextile products and articles: asphalt overlay; road and railroad beds; lining for dam and stream embankments; tennis courts; artificial turfs; and pond liners.

Leisure. travel articles and products: sleeping bags; tarpaulins; tents; artificial leather products, such as luggage; and airline headrests.

Construction/civil engineering articles and products: roofing and tile underlay; acoustical ceilings; insulation; house wrap; and pipe wrap.

Office products and articles: book covers; mailing envelopes; labels; maps; signs; pennants; disk liners; and pen nibs.

EXAMPLES

Example 1—Preparation of S-M-M-M-S Composite

A ground calcium carbonate (GCC) coated with stearic acid and possessing a $d_{50}$ of about 1.35 μm was compounded with polypropylene resin to obtain a masterbatch.

The masterbatches were combined with further polypropylene resin and spunbond (S) and meltblown (M) nonwoven sheets were prepared. Sheets comprised either 0% filler, 5% filler, or 10% filler. Note that the '7%' and '14%' filler levels specified in Tables 2 and 3 below are the amount of filler used in the masterbatch used to prepare each S or M layer. Processing conditions of the S and M process that were kept constant are summarized in Table 1 below.

TABLE 1

| S | Total throughput [kg/h] | 210 |
|---|---|---|
|   | process air temperature [° C.] | 20 |
|   | Extrusion temperature [° C.] | 240 |
|   | Die temperature [° C.] | 245 |
|   | Cabin pressure [Pa] | 4000 |
| M | Total throughput [kg/h] | 25 |
|   | process air temperature [° C.] | 260 |
|   | Extrusion temperature [° C.] | 290 |
|   | Die temperature [° C.] | 250 |
|   | nip pressure [N/mm] | 80 |
|   | heated press roll set [° C.] | 120 |

Spin pump was adjusted where needed to account for the higher density of the filler compared to virgin PP.

Spin belt: Nippon Filcron; Die configuration: Number of holes per m: ca. 5800

S-M-M-M-S products were run at 34 gsm and 54 gsm for various combinations of S and M sheets, as summarized in Tables 2 and 3 below. The same thermal bonding calendering temperature was used for each product, save for the first '0 & 0' product in Table 3, in which the thermal bonding calendering temperature was 5° C. less than the temperature used in the preparation of all other products."

Each product was tested for HSH, air permeability, MD tensile strength and elongation, and CD tensile strength and elongation in accordance with the test methods described above. Results are summarised in FIGS. 3-5 (for 54 gsm products) and FIGS. 6-8 (for 34 gsm products).

As can be seen from the data, the addition of filler in the S layers enhances tensile strength both in MD and CD. This is a surprising result since it would be expected that the increase in tensile strength would be compromised by a lowering of the HSH.

TABLE 2

| Experiment* | Fabric weight (gsm) | % filler in S | % filler in M | Line Speed (m/min) | hydro-head [mm] | air permeability [l/m²s] | MD Tensile (N/5 cm) | CD Tensile (N/5 cm) | % MD Elongation | % CD Elongation |
|---|---|---|---|---|---|---|---|---|---|---|
| 0 & 0 | 54 | 0 | 0 | 148 | 1180 | 200 | 93.2 | 46 | 33 | 38 |
| 7 & 0 | 54 | 7 | 0 | 148 | 1200 | 202 | 132.1 | 44.9 | 60 | 50 |
| 14 & 0 | 54 | 14 | 0 | 148 | 1186 | 187 | 140.7 | 46 | 68 | 53 |
| 14 & 7 | 54 | 14 | 7 | 148 | 795 | 217 | 131.2 | 51.1 | 69 | 63 |
| 14 & 14 | 54 | 14 | 14 | 148 | 705 | 235 | 146.2 | 52.8 | 75 | 64 |
| 7 & 14 | 54 | 7 | 14 | 148 | 625 | 323 | 130.8 | 52.3 | 66 | 62 |
| 0 & 14 | 54 | 0 | 14 | 148 | 680 | 294 | 104.5 | 51.5 | 47 | 44 |

*"0 & 0", etc., is referring to the amount of filler in each of the spunbond (S) and meltblown (M) layers used to make the S-M-M-M-S products.

TABLE 3

| Experiment | Fabric Weight (gsm) | % filler in Spunbond | % filler in MB | Line Speed (m/min) | hydro-head [mm] | air permeability [l/m²s] | MD Tensile (N/5 cm) | CD Tensile (N/5 cm) | % MD Elongation | % CD Elongation |
|---|---|---|---|---|---|---|---|---|---|---|
| 0 & 0 | 34 | 0 | 0 | 225 | 789 | 500 | 76.3 | 32.2 | 50 | 43 |
| 0 & 0 | 34 | 0 | 0 | 225 | 733 | 425 | 90.7 | 42.2 | 68 | 60 |
| 7 & 0 | 34 | 7 | 0 | 225 | 821 | 427 | 101.2 | 40.9 | 83 | 74 |
| 14 & 0 | 34 | 14 | 0 | 225 | 815 | 422 | 107.1 | 40.2 | 90 | 84 |
| 14 & 7 | 34 | 14 | 7 | 255 | 679 | 475 | 103 | 41.7 | 91 | 89 |
| 14 & 14 | 34 | 14 | 14 | 225 | 501 | 483 | 102.2 | 45.1 | 93 | 93 |
| 7 & 14 | 34 | 7 | 14 | 225 | 481 | 573 | 98 | 46.8 | 94 | 85 |

The invention claimed is:

1. A composite structure comprising at least two nonwoven, polymeric layers bonded to each other, wherein
   at least one of the nonwoven, polymeric layers is spunbonded,
   at least one of the nonwoven, polymeric layers is meltblown,
   at least one of the spunbonded layers comprises inorganic particulate filler in an amount from about 12% by weight to about 16% by weight of the spunbonded layer, and
   each of the meltblown layers comprises less than about 5% by weight inorganic particulate material, based on the total weight of each meltblown layer.

2. The composite structure according to claim 1, wherein the composite structure has one or more of the following physical and mechanical properties:
   i. a hydrostatic head ranging from about 400 mm to about 1000 mm;
   ii. an air permeability ranging from about 400 l/m²s to about 900 l/m²s;
   iii. a MD tensile strength ranging from about 95.0 N/5 cm to about 120.0 N/5 cm;
   iv. a CD tensile strength ranging from about 40.0 N/5 cm to about 60.0 N/5 cm;
   v. a MD elongation ranging from about 60% to about 120%; and
   vi. a CD elongation ranging from about 60% to about 120%.

3. The composite structure according to claim 2, wherein the at least one spunbonded layer is an outermost layer of the structure.

4. The composite structure according to claim 2, wherein the composite structure has an S-M-S layered structure, or an S-M-M-S layered structure, or an S-M-M-M-S layered structure, or an S-M-M-M-M-S layered structure, wherein the S layers are spunbonded layers and the M layers are meltblown layers, and wherein one S layer comprises inorganic particulate filler in an amount from about 12% to about 16% by weight of the layer and the other S layer comprises inorganic particulate filler in an amount up to about 40% by weight of the layer.

5. The composite structure according to claim 4, wherein at least one of the meltblown layers is substantially free of inorganic particulate filler.

6. The composite structure according to claim 2, wherein the composite structure has an S-S-M-S layered structure, or an S-S-M-S-S layered structure, or an S-S-M-M-S layered structure, or an S-S-M-M-S-S layered structure, or an S-S-M-M-M-S layered structure, or an S-S-M-M-M-S-S layered structure, or an S-S-M-M-M-M-S layered structure, or an S-S-M-M-M-M-S-S layered structure,
   wherein the S layers are spunbonded layers and the M layers are meltblown layers, and
   wherein one outermost S layer comprises inorganic particulate filler in an amount from about 12% to about 16% by weight of the layer and the second outermost S layer comprises inorganic particulate filler in an amount up to about 40% by weight of the layer.

7. The composite structure according to claim 6, wherein at least one of the meltblown layers is substantially free of inorganic particulate filler.

8. The composite structure according to claim 1, comprising at least three nonwoven, polymeric layers bonded to each other.

9. The composite structure according to claim 1, wherein the meltblown layer or layers each are substantially free of inorganic particulate filler.

10. The composite structure according to claim 1, wherein the composite structure has a basis weight ranging from about 10 to about 100 gsm.

11. The composite structure according to claim 1, wherein the composite structure has one or more of the following physical and mechanical properties:
    i. a ratio of hydrostatic head (in mm)/MD tensile strength (in N/5 cm) of less than about 10.0;

ii. a ratio of hydrostatic head (in mm)/CD tensile strength (in N/5 cm) of less than about 17.0;

iii. a ratio of hydrostatic head (in mm)/MD elongation (in %) of less than about 12.0; and iv. a ratio of hydrostatic head (in mm)/CD elongation (in %) of less than about 12.0.

12. The composite structure according to claim 1, wherein the inorganic particulate material is selected from an alkaline earth metal carbonate or sulphate, calcium carbonate, magnesium carbonate, dolomite, gypsum, a hydrous kandite clay, kaolin, halloysite, ball clay, an anhydrous kandite clay, metakaolin, fully calcined kaolin, wollastonite, bauxite, talc, mica, perlite, diatomaceous earth, magnesium hydroxide, aluminum trihydrate, or combinations thereof.

13. The composite structure according to claim 12, wherein the inorganic particulate material is an alkaline earth metal carbonate.

14. The composite structure according to claim 13, wherein the inorganic particulate material is calcium carbonate having a median particle size $d_{50}$ ranging from about 0.1 μm to about 10 μm.

15. The composite structure according to claim 13, wherein the inorganic particulate material is calcium carbonate having a top cut of about 15 μm or less.

16. The composite structure according to claim 1, wherein the inorganic particulate material is coated with one or more fatty acids or salts or esters thereof.

17. The composite structure according to claim 1, wherein the nonwoven, polymeric layers comprise polymer resin selected from polyolefins, polypropylene, polyethylene homopolymers and copolymers, copolymers with 1-butene, 4-methyl-1-pentene, 1-hexane, polyamides, nylon, polyesters, copolymers of any of the above-mentioned polymers, and blends thereof.

18. The composite structure according to claim 17, wherein the polymer resin is polypropylene.

19. An article formed from or comprising the composite structure according to claim 1.

20. The article according to claim 19, wherein the article is at least one of a health care article, a personal care article, or a hygiene article.

* * * * *